US009558607B2

(12) United States Patent
Eder

(10) Patent No.: US 9,558,607 B2
(45) **Date of Patent: *Jan. 31, 2017**

(54) RELAY ATTACK PREVENTION USING RSSIPPLX

(71) Applicant: Infineon Technologies AG, Neubiberg (DE)

(72) Inventor: Manfred Eder, Manfred (AT)

(73) Assignee: Infineon Technologies AG, Neubiberg (DE)

( * ) Notice: Subject to any disclaimer, the term of this patent is extended or adjusted under 35 U.S.C. 154(b) by 860 days.

This patent is subject to a terminal disclaimer.

(21) Appl. No.: 13/676,222

(22) Filed: Nov. 14, 2012

(65) Prior Publication Data

US 2014/0132391 A1 May 15, 2014

(51) Int. Cl.

| | |
|---|---|
| ***G05B 19/00*** | (2006.01) |
| ***G05B 23/00*** | (2006.01) |
| ***G06F 7/00*** | (2006.01) |
| ***G06F 7/04*** | (2006.01) |
| ***G07C 9/00*** | (2006.01) |

(52) U.S. Cl.

CPC . *G07C 9/00309* (2013.01); *G07C 2009/00555* (2013.01)

(58) Field of Classification Search

CPC .... H04W 12/08; H04W 12/06; G07C 9/00111

USPC ......................... 340/10.1–10.31, 10.4–10.52, 340/426.13–426.17, 5.1–5.23, 5.8–5.86

See application file for complete search history.

(56) References Cited

U.S. PATENT DOCUMENTS

| | | | | |
|---|---|---|---|---|
| 5,714,937 | A * | 2/1998 | Campana, Jr. | 340/573.1 |
| 5,815,477 | A * | 9/1998 | Kimura | G11B 7/0045 369/116 |
| 5,905,431 | A * | 5/1999 | Mueller et al. | 340/426.17 |
| 5,973,601 | A * | 10/1999 | Campana, Jr. | 340/573.4 |
| 6,101,428 | A * | 8/2000 | Snyder | 701/2 |
| 6,404,716 | B1 * | 6/2002 | Saga | G11B 7/0045 369/116 |
| 6,570,486 | B1 * | 5/2003 | Simon et al. | 340/5.1 |
| 6,611,755 | B1 * | 8/2003 | Coffee et al. | 701/482 |
| 6,754,503 | B1 * | 6/2004 | Aldaz et al. | 455/504 |
| 6,757,261 | B1 * | 6/2004 | Olgaard et al. | 370/280 |
| 6,760,599 | B1 * | 7/2004 | Uhlik | 455/525 |
| 7,046,119 | B2 * | 5/2006 | Ghabra et al. | 340/5.72 |
| 7,551,083 | B2 * | 6/2009 | Modes et al. | 340/572.1 |
| 8,040,251 | B2 * | 10/2011 | Spencer | 340/870.16 |

(Continued)

*Primary Examiner* — Amine Benlagsir
*Assistant Examiner* — Son M Tang
(74) *Attorney, Agent, or Firm* — Eschweiler & Associates, LLC

(57) ABSTRACT

The disclosed invention relates to a passive keyless entry receiver system having an application controller that is activated upon receipt of an entire payload of a data packet to determine if peak RSSI levels for a plurality of RSSI steps within the payload match an expected sequence of peak RSSI levels (i.e., if a fingerprint is genuine). The receiver system has a receiver that receives a wireless signal having a data packet with a plurality of power levels within a plurality of RSSI steps of the payload. The receiver system writes a plurality of peak RSSI levels to a plurality of RSSI peak payload registers that store the peak RSSI levels for RSSI steps of the payload. Once an entire payload of a data packet has been received an application controller determines if the peak payloads correspond to an expected sequence of power levels.

17 Claims, 4 Drawing Sheets

(56) References Cited

U.S. PATENT DOCUMENTS

| | | | | |
|---|---|---|---|---|
| 2002/0024427 | A1* | 2/2002 | Banas | 340/425.5 |
| 2002/0029386 | A1* | 3/2002 | Robbins | 725/56 |
| 2002/0094778 | A1* | 7/2002 | Cannon et al. | 455/41 |
| 2003/0054847 | A1* | 3/2003 | Kim et al. | 455/517 |
| 2003/0122673 | A1* | 7/2003 | Anderson | 340/568.7 |
| 2005/0046546 | A1* | 3/2005 | Masudaya | 340/5.61 |
| 2005/0223280 | A1* | 10/2005 | Bergler et al. | 714/18 |
| 2006/0083206 | A1* | 4/2006 | Min | 370/338 |
| 2006/0136997 | A1* | 6/2006 | Telek et al. | 726/5 |
| 2006/0252448 | A1* | 11/2006 | Ichikawa | 455/522 |
| 2009/0221240 | A1* | 9/2009 | Zhang | 455/68 |
| 2011/0009129 | A1* | 1/2011 | Lim et al. | 455/456.1 |
| 2012/0062381 | A1* | 3/2012 | Liu et al. | 340/572.1 |
| 2012/0264447 | A1* | 10/2012 | Rieger, III | 455/456.1 |
| 2013/0030747 | A1* | 1/2013 | Ganick et al. | 702/95 |
| 2013/0079030 | A1* | 3/2013 | Kang et al. | 455/456.1 |
| 2013/0106576 | A1* | 5/2013 | Hinman et al. | 340/10.1 |
| 2013/0106577 | A1* | 5/2013 | Hinman et al. | 340/10.1 |
| 2013/0165144 | A1* | 6/2013 | Ziskind et al. | 455/456.1 |
| 2013/0229235 | A1* | 9/2013 | Ohnishi | H03F 1/0266 330/297 |
| 2014/0085526 | A1* | 3/2014 | Takahashi et al. | 348/333.02 |

* cited by examiner

RELAY ATTACK PREVENTION USING RSSIPPLX

BACKGROUND

A relay attack is a type of hacking technique that can be used to trick wireless passive keyless entry systems. In a typical relay attack, an attacker operates a proxy device (i.e., a relay) to relay a data packet comprising a secret key/code from a sender (e.g., a keyless fob, keyless payment device, etc.) to a valid receiver of the data packet (e.g., an automobile, computer, etc.). For example, a hacker may follow an automobile owner with a relay that forwards a data packet comprising a secret key/code of an automobile's keyless fob to the automobile. If the attacker comes close to the car this triggers a challenge signal from the car (typically an LF frequency at about 125 kHz), which gets relayed to the automobile owner's keyless fob. The keyless fob responds to this challenge by transmitting a data pack that is again relayed by the relay. The relayed data packet will provide the secret key/code to the automobile, disarming the automobile's alarm or unlocking the automobile without the automobile owner knowing.

DETAILED DESCRIPTION

Figure 1:
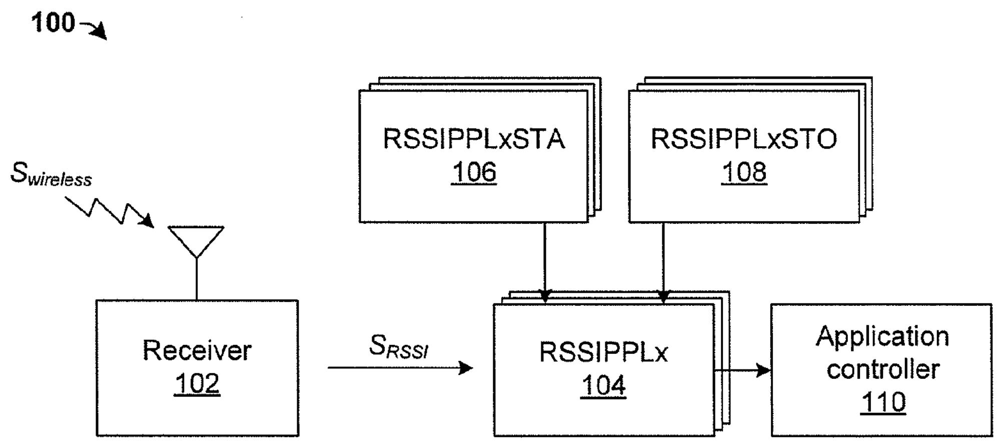
FIG. 1 illustrates a block diagram of some embodiments of a disclosed passive keyless entry receiver system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

Proxy devices (i.e., relays) used in relay attacks typically comprise a transceiver configured to intercept a code and to transmit the intercepted code to a base station at a constant RSSI power level. Therefore, one method that can be used to prevent relay attacks is to transmit an RF response from a keyless fob to a base station (e.g., a car, house, garage, computer, etc.) with different RSSI power levels during a payload of a data packet. Differences between RSSI power levels that change at specific points in time form a fingerprint that is measured by an application controller in the base station. If RSSI power level differences of a received signal occur at the specific points in time, the fingerprint is recognized, indicating that the code is genuine and causing the application controller to grant access to the base station. If the power level differences do not occur at the specific points in time, the fingerprint is not recognized, indicating that the code is not genuine and causing the application controller to not grant access to the base station.

Typically, a receiving system within a base station comprises a radio receiver configured to receive a data packet from a wireless transmitter (e.g., a keyless fob). The radio receiver outputs an RSSI (Receive Signal Strength Indicator) signal, which is measured by an application controller at the specific points in time, so that RSSI differences (e.g., an RSSI value change relative to a peak RSSI level at a beginning of a payload) can be determined. However, to determine RSSI differences, the application controller needs to be active during the specific points in time, which consumes a large amount of power.

The present disclosure relates to a passive keyless entry receiver system that is configured to activate an application controller, upon receipt of an entire payload of a data packet, to determine if peak RSSI levels for a plurality of RSSI steps within a payload match expected values (La, if a fingerprint is genuine). The receiver system comprises a receiver configured to receive a wireless signal comprising a data packet having a plurality of power levels within a plurality of pre-defined bit ranges (i.e., RSSI steps) of a payload. The receiver writes a plurality of peak RSSI levels to RSSI peak payload registers configured to store peak RSSI levels corresponding to the pre-defined bit ranges of the payload. Once an entire payload of a data packet has been received, an application controller is configured to determine if the peak RSSI levels stored in the RSSI peak payload registers correspond to an expected sequence of power levels (e.g., power level differences). By activating the application controller upon receipt of the entire payload, the time the application controller is activated is reduced, reducing current consumption of the receiver system.

FIG. 1 illustrates a block diagram of some embodiments of a disclosed passive keyless entry receiver system 100.

The receiver system 100 comprises a receiver 102 configured to receive a wireless signal $S_{wireless}$ (e.g., an RF signal) comprising a data packet having a payload With a code. Based upon the received wireless signal $S_{wireless}$, the receiver 102 is configured to output an RSSI (Receive Signal Strength Indicator) signal $S_{RSSI}$ indicating a power level of the received wireless signal $S_{wireless}$. The RSSI signal $S_{RSSI}$ changes power levels over a plurality of different power levels as the payload is received in a predetermined procession that provides for an expected sequence of power level differences that form a fingerprint.

The receiver system 100 further comprises a plurality of RSSI peak payload registers 104. The receiver 102 is configured to generate RSSI signals that write peak RSSI levels to the plurality of RSSI peak payload registers 104, so that respective RSSI peak payload registers 104 store a peak RSSI level corresponding to a pre-defined bit range (i.e., an RSSI step) in the payload. For example, a first RSSI peak payload register RSSIPPL1 is configured to store a peak RSSI level for a first bit range (i.e., a first RSSI step) of a payload, a second peak payload RSSI peak payload register RSSIPPL2 is configured to store a peak RSSI level for a second bit range (i.e., a second RSSI step) of the payload, etc.

One or more start registers 106 and stop registers 108 are associated with each RSSI peak payload register 104. The one or more start registers 106 define starting positions of RSSI steps within a payload. The one or more stop registers 108 define stopping positions of RSSI steps within the payload. Collectively, the one or more start and stop registers, 106 and 108, define the RSSI steps at which peak RSSI levels are expected to form the expected sequence of power level differences (i.e., the expected fingerprint).

In some embodiments, the start and stop registers, 106 and 108, store bit values, such that the RSSI steps are defined in terms of bits in a payload. For example, a first RSSI peak payload register RSSIPPL1 may be configured to store an initial input power having a peak RSSI level between a first starting bit stored in RSSIPPL1STA having a value of payload bit 1 and a first stopping bit stored in RSSIPPL1STO having a value of payload bit 8. Similarly, a second RSSI peak payload register RSSIPPL2 may be configured to store a peak RSSI level between a second starting bit stored in RSSIPPL2STA having a value of payload bit 9 and a second stopping bit stored in RSSIPPL2STO having a value of payload bit 24.

An application controller 110 is configured to utilize the plurality of peak RSSI levels, stored in the plurality of RSSI peak payload registers 104, to determine if power levels of the payload correspond to an expected sequence of power levels (i.e., the expected fingerprint) of the payload. For example, if the plurality of peak RSSI levels within the RSSI steps are equivalent to peak values expected within the RSSI steps, the application controller 110 determines that the fingerprint of the received wireless signal $S_{wireless}$ is genuine. Alternatively, if the plurality of peak RSSI levels within the RSSI steps are not equivalent to peak values expected within the RSSI steps, the application controller 110 determines that the fingerprint of the received wireless signal $S_{wireless}$ is not genuine.

In some embodiments, the application controller 110 is configured to utilize the plurality of peak RSSI levels, to determine if power levels of the payload correspond to an expected sequence of power levels, after an entire payload of the data packet has been received. By utilizing a plurality of peak RSSI levels stored in the plurality of RSSI peak payload registers 104, the application controller 110 can determine if a fingerprint of a received payload is authentic without being active during receipt of the entire payload (i.e., with a relatively low power consumption).

It will be appreciated that the disclosed receiver system is not limited to any type of keyless entry system, but rather may be used in any type of wireless RF system that is susceptible to relay attacks. For example in some embodiments, the disclosed receiver system may be used in an automobile keyless entry system. In other embodiments, the disclosed receiver system may be used in a keyless payment device.

Figure 2:
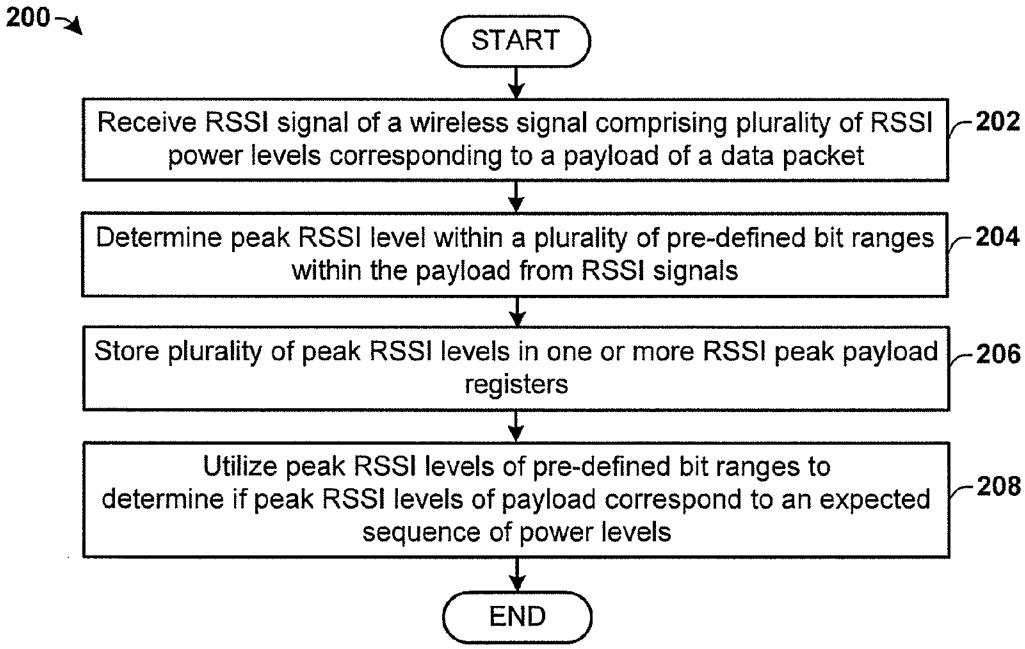
FIG. 2 is a flow diagram of an exemplary method of preventing a relay attack in a passive keyless entry receiver system.

FIG. 2 is a flow diagram of some embodiments of a method 200 of preventing a relay attack in a passive keyless entry receiver system.

At 202, an RSSI (receive signal strength indicator) signal of a wireless signal is received. The RSSI signal comprises a plurality of different RSSI power levels corresponding to a payload of a data packet, transmitted by the wireless signal, which comprises a code that grants access to a keyless entry system. The payload changes between the plurality of different RSSI power levels in a predetermined sequence. For example, in some embodiments the power level of the RSSI signal is configured to vary after a pre-determined number of bits of a payload. The predetermined sequence defines a fingerprint of the payload.

At 204, peak RSSI levels corresponding to a plurality of pre-defined bit ranges RSSI steps) within the payload of the data packet are determined.

At 206, the plurality of peak RSSI levels are stored in one or more RSSI peak payload registers. In some embodiments, a peak RSSI level for a first RSSI step comprising a first pre-defined range is stored in a first RSSI peak payload register, a second peak RSSI level for a second RSSI step comprising a second pre-defined range is stored in a second RSSI peak payload register, etc.

At 208, the peak RSSI levels of the plurality of pre-defined bit ranges are utilized to determine if peak RSSI levels of the payload correspond to expected sequence of peak RSSI levels (e.g., an expected sequence of peak RSSI level differences). In some embodiments, the peak RSSI levels of the plurality of pre-defined bit ranges are utilized to determine if peak RSSI levels of the payload correspond to expected sequence of peak RSSI levels once an entire payload of a data packet is received. By determining if the peak RSSI levels of payload correspond to expected sequence of peak RSSI levels after an entire payload has been received, the authenticity of a received fingerprint of a payload is able to be determined in a relatively short time period.

Figure 3:
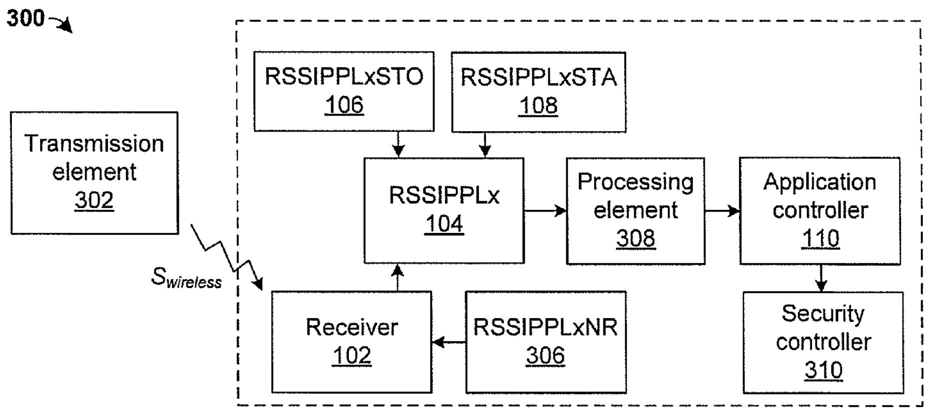
FIG. 3 illustrates a block diagram of some embodiments of a disclosed passive keyless entry receiver system.

FIG. 3 illustrates a block diagram of some embodiments of a disclosed passive keyless entry system 300.

Receiver system 300 comprises a transmission element 302 configured to transmit a wireless signal $S_{wireless}$ (e.g., an RF signal) to a base station 304 comprising a receiver 102. The wireless signal $S_{wireless}$ comprises a data packet having a payload that comprises a code that grants access to the base station 304. In some embodiments, the base station may comprise an automobile, a house, a garage, etc.

The receiver 102 is configured to receive the wireless signal $S_{wireless}$ and based thereupon to write peak RSSI levels of the wireless signal $S_{wireless}$ to one or more RSSI peak payload registers 104. The RSSI peak payload registers 104 store peak RSSI levels for different RSSI steps defined by start and stop bits stored in start registers 106 and stop registers 108. In some embodiments, a number of RSSI steps in a payload are stored in a register 306, which can be accessed by the receiver 102. In some embodiments, a number of RSSI steps are equal to the number of different power levels of an expected fingerprint of a payload within the data packet.

A processing element 308 is connected to the one or more RSSI peak payload registers 104. The processing element 308 is configured to analyze the peak RSSI levels of the payload stored in the one or more RSSI peak payload registers 104. In some embodiments, the processing element 308 is configured to analyze the peak RSSI levels of the payload to determine if a fingerprint of the payload is genuine upon receipt of an entire payload. In other embodiments, the processing element 308 is configured to analyze the peak RSSI levels of the payload to determine if a fingerprint of the payload is genuine during receipt of the payload. In some embodiments, the processing element 308 is configured to determine peak RSSI level differences between peak RSSI levels stored for different RSSI steps and to compare the calculated peak RSSI level differences to expected RSSI differences.

The processing element 308 is in communication with an application controller 110 (e.g., a micro-controller) configured to operate in a normal operating mode or in a sleep mode. In the normal operating mode, the application controller 110 has a full functionality (e.g., to constantly monitor RSSI levels) that causes the application controller 110 to operate with a first power consumption level. In the sleep mode, the application controller 110 has a limited functionality that causes the application controller 110 to operate with a second power consumption level that is less than the first power consumption level.

During receipt of the payload, the application controller 110 may be operated in sleep mode to reduce the power consumption. Upon receipt of the entire payload, the application controller 110 may be switched to normal operating mode to determine if the fingerprint of the payload is genuine based upon analysis of the processing element 308. By determining the authenticity of a fingerprint of a payload from stored peak RSSI levels of different RSSI steps in different RSSI peak payload registers, the application controller 110 does not have to actively measure the peak RSSI levels during reception of a data packet and therefore can be operated in a sleep mode that reduces the overall power consumption of the base station 304.

For example, if the processing element 308 determines that the peak RSSI levels of a received payload have a magnitude and temporal component equivalent to an expected peak RSSI levels for pre-defined bit ranges (i.e., that a fingerprint of the received payload is genuine), the authenticity of the fingerprint can be communicated to the application controller 110 upon entering normal operating mode. The application controller 110 can subsequently operate a security element 310 to grant access to the base station 304. Alternatively, if the processing element 308 determines that the peak RSSI levels of a received payload have a magnitude and temporal component that is not equivalent to an expected peak RSSI levels for pre-defined bit ranges (i.e., a fingerprint of the received payload is not genuine), the falsity of the fingerprint can be communicated to the application controller 110 upon entering normal operating mode. The application controller 110 can subsequently operate a security element 310 to deny access to the base station 304.

In some embodiments, the processing element 308 is configured to generate an end of message interrupt, which is sent to the application controller 110. Upon receiving the end of message interrupt, the application controller 110 queries a result bit to evaluate an authenticity of the payload after receipt of the entirety of the payload. In other embodiments, upon receipt of a genuine RSSI fingerprint the processing element 308 is configured to generate an end of message interrupt, which is sent to application controller 110, to indicate that a genuine RSSI fingerprint has been received and that causes the application controller 110 to grant access to the base station 304.

Figure 4A:
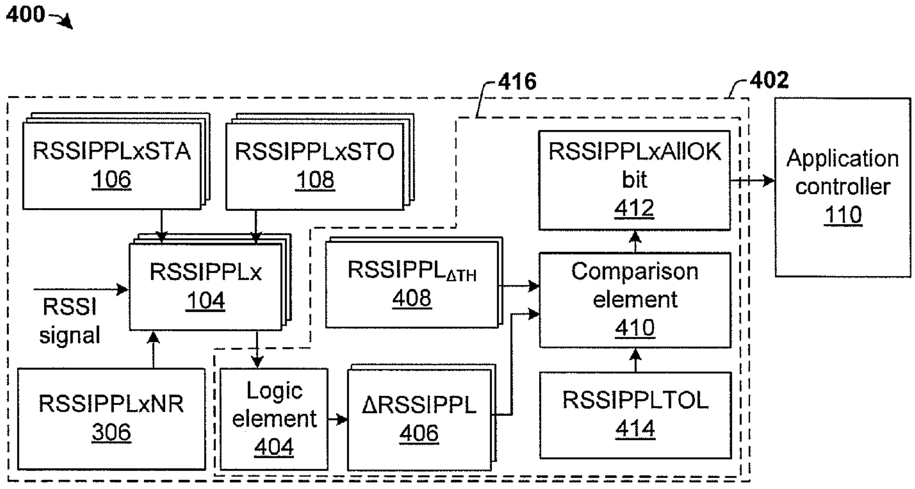
FIG. 4A illustrates a more detailed example of a block diagram of an embodiment of a disclosed passive keyless entry receiver system.

FIG. 4A illustrates a more detailed embodiment of a block diagram of a disclosed passive keyless entry receiver system 400. The passive keyless entry receiver system 400 comprises an RF block 402 (e.g., an receiver chip) and an application controller 110.

The RF block 402 comprises a plurality of RSSI peak payload registers 104 and a processing unit 416. The RSSI peak payload registers 104 are configured to store peak RSSI levels for different RSSI steps defined by start and stop bits stored in registers 106 and 108, as described above. In some embodiments, a number of RSSI steps are stored in a register 306. The processing unit 416 is configured to read peak RSSI levels from the RSSI peak payload registers 104 and to write a result bit into result bit register 412 based upon the peak RSSI levels.

In some embodiments, the processing unit 416 comprises a difference calculation element 404 configured to read the peak RSSI levels from RSSI peak payload registers 104 and to calculate RSSI differences between the peak RSSI levels (e.g., between peak RSSI levels stored in RSSIPPL1 and the other RSSIPPLx registers). The calculated RSSI differences may be stored in one or more RSSI difference registers 406. The calculated RSSI differences are provided to a comparison element 410 that is configured to compare the calculated RSSI differences to expected RSSI differences that are stored in one or more registers 408.

If the comparison element 410 determines that the RSSI differences are not equivalent to the expected RSSI differences within RSSI steps of the payload, the comparison element 410 sets a results bit in result bit register 412 to a first value indicating that the fingerprint of the received signal is not genuine. If the comparison element 410 determines that the RSSI differences are equivalent to the expected RSSI differences within RSSI steps of the payload, the comparison element 410 sets a results bit in a result bit register 412 to a second value indicating that the fingerprint of the received signal is genuine. In some embodiments, the result bit can be automatically reset to a first value at the beginning of the payload. An application controller 110 is configured to query the result bit register 412 to access the result bit and to grant access to the processing unit 416 based on a value of the result bit.

In some embodiments, the comparison element 410 is configured to read a tolerance value from a separate tolerance register 414 configured to store one or more tolerance values and to determine if the calculated RSSI differences are within the one or more tolerance values of an expected RSSI differences. In some embodiments, tolerance register 414 is configured to store a tolerance value that is shared between different RSSI steps. In other embodiments, tolerance register 414 is configured to store a plurality of different tolerance value that are used for different RSSI steps. For example, a first RSSI step may have a first tolerance, a second RSSI step may have a second tolerance, etc.

Because the application controller 110 does not constantly monitor values of the peak RSSI levels, the application controller 110 can simply use the result bit of the radio part and therefore the application controller 110 can stay in sleep mode during payload reception. The result is that the total current consumption of the receiver system 400 can be further reduced.

Figure 4B:
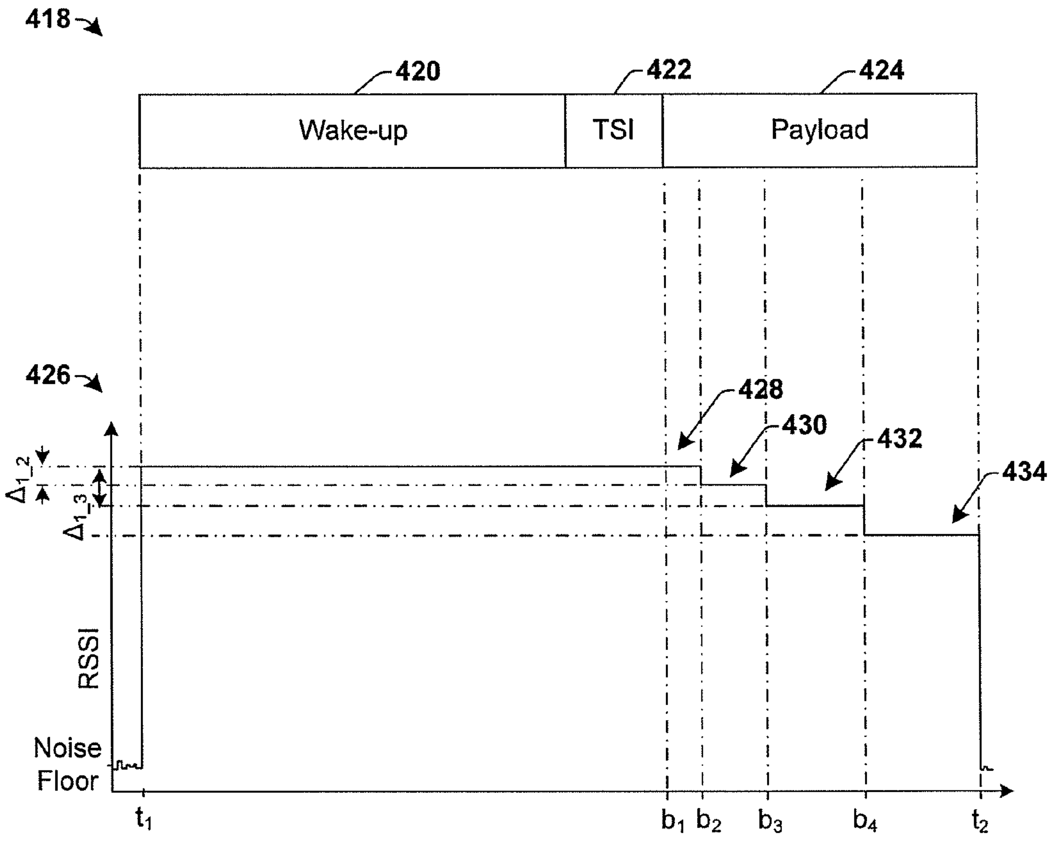
FIG. 4B illustrates a timing diagram illustrating operation of the disclosed passive keyless entry receiver system.

FIG. 4B illustrates a data packet 418 and an associated timing diagram 426 illustrating operation of passive keyless entry receiver system 400.

The data packet 418 comprises a wake-up section 420, a TSI (transport session identifier) section 422, and a payload section 424. The wake-up section 420 comprises a data sequence that tells if a receiver is to be activated to receive the data packet. For example, if the data sequence of the wake-up section 420 matches an expected wake-up sequence then the receiver will stay on. If the data sequence does not match the expected wake-up sequence then the receiver will turn off. The TSI (transport session identifier) section 422 comprises a data sequence that indicates that the payload is beginning. The payload section 424 comprises a code that grants access to a base station.

As shown in timing diagram 426, the data packet 418 is received at time $t_1$. The payload section 424 of the data packet 418 comprises a RSSI level (y-axis) that varies between a plurality of different power levels as a function of time (x-axis) during the payload section of the data packet. For example, timing diagram illustrates a payload having 4 RSSI steps. A first RSSI step 428 is present between a first payload bit b1 and a second payload bit b2 (e.g., b1=1 bit and b2=8 bits), and has an RSSI signal with a first power level. A second RSSI step 430 is present between the second payload bit b2 and a third payload bit b3 (e.g., b2=8 bits and b3=24 bits), and has an RSSI signal with a second power level. A third RSSI step 432 is present between the third payload bit b3 and a fourth payload bit b4 (e.g., b3=24 bits and b4=48 bits), and has a RSSI signal with a third power level. A fourth RSSI step 434 is present between the fourth payload bit b4 and a fifth payload bit corresponding to the end of the payload at time $t_2$, and has a RSSI signal with a fourth power level.

Once a last payload bit has been received at time $t_2$ the entire payload is received and a processing unit is configured to calculate RSSI differences between peak RSSI levels that have been stored in RSSI peak payload registers. For example, a first difference $\Delta_{1\_2}$ is determined between a peak RSSI level of the first RSSI step 428 and a peak RSSI level of the second RSSI step 430. A second difference $\Delta_{1\_3}$ is determined between a peak RSSI level of the first RSSI step 428 and a peak RSSI level of the third RSSI step 432. If the differences are within a tolerance of an expected difference, a result bit is set to a value that indicates that the received fingerprint is genuine.

Figure 5:
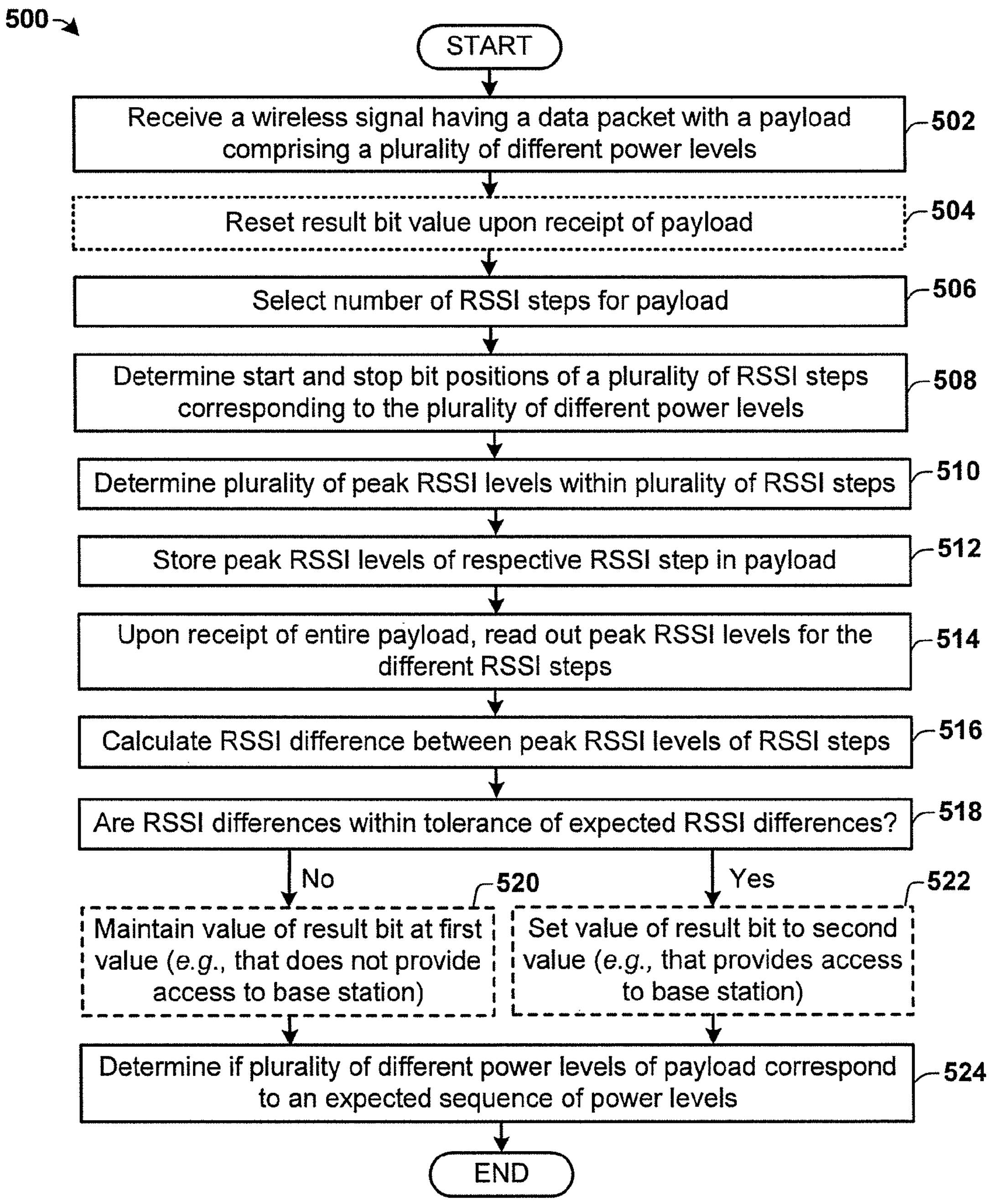
FIG. 5 is a flow diagram of an exemplary method of preventing a relay attack in a passive keyless entry receiver system.

FIG. 5 is a flow diagram of an exemplary method 500 of preventing a relay attack in a passive keyless entry receiver system.

While the disclosed methods (e.g., methods 200 and 500) are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects of the description herein. Further, one or more of the acts depicted herein may be carried out in one or more separate acts and/or phases.

At 502, a wireless signal having a data packet with a payload comprising a plurality of different power levels is received.

At 504, a value of a result bit may be reset upon receipt of the payload of the data packet. For example, at a beginning of a received payload of a data packet the result bit may be reset to a first value (e.g., a "0").

At 506, a number of RSSI steps may be selected for the payload. The number of RSSI steps may be equal to a pre-defined number of power level differences within an expected fingerprint of the payload.

At 508, start and stop positions for each RSSI step corresponding to the plurality of different power levels are determined. In some embodiments, the start and stop positions may comprise times. In other embodiments, the start and stop positions may comprise bit positions within the payload that RSSI steps start and stop. For example, a first RSSI step may start at a $1^{st}$ bit of the payload and end at an $8^{th}$ bit of the payload. In some embodiments the start and stop positions are read from separate registers configured to store start and stop positions.

At 510, a plurality of peak RSSI levels are determined within plurality of RSSI steps For example, a first peak RSSI level is determined within a first RSSI step, a second peak RSSI level is determined within a second RSSI step, etc.

At 512, a peak RSSI level for respective RSSI steps in the payload are stored in RSSI peak payload registers.

At 514, peak RSSI levels for the different RSSI steps are read out from RSSI peak payload registers upon receipt of the entire payload.

At 516, differences between peak RSSI levels of different RSSI steps are calculated. For example, a difference between a first peak RSSI level and a second peak RSSI level is calculated, a difference between a first peak RSSI level and a third peak RSSI level is calculated, etc.

At 518, the RSSI differences are compared to expected RSSI differences.

In some embodiments, if the RSSI differences are not within a tolerance of the expected RSSI differences, a result bit value is maintained at a first value (e.g., a "0") that does not provide access to a keyless entry system, at 520.

In some embodiments, if the RSSI differences are within a tolerance of the expected RSSI differences, a value of a result bit set is to a second value (e.g., a "1") that provides access to a keyless entry system, at 522.

At 524, an authenticity of a fingerprint (i.e., if plurality of different power levels of payload correspond to an expected sequence of power levels) of the received wireless signal is determined. In some embodiments, a value of the result bit is queried to determine if the plurality of different power levels of the payload correspond to an expected sequence of power levels. If the plurality of peak RSSI levels within the RSSI steps correspond to peak values expected within the RSSI steps, a fingerprint of the received wireless signal is authentic. Alternatively, if the plurality of peak RSSI levels within the RSSI steps do not correspond to peak values expected within the RSSI steps, the fingerprint of the received wireless signal is not authentic. In other embodiments, an interrupt signal may be generated based upon the power level differences, wherein the interrupt signal signals an authenticty of the fingerprint of the received wireless signal.

Although the disclosure has been shown and described with respect to one or more implementations, equivalent alterations and modifications will occur to others skilled in the art based upon a reading and understanding of this specification and the annexed drawings. Further, it will be appreciated that identifiers such as "first" and "second" do not imply any type of ordering or placement with respect to other elements; but rather "first" and "second" and other similar identifiers are just generic identifiers. In addition, it will be appreciated that the term "coupled" includes direct and indirect coupling. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A passive keyless entry receiver system, comprising:

a receiver configured to receive a wireless signal having a data packet with a payload comprising a plurality of different power levels having a plurality of peak RSSI (Receive Signal Strength Indicator) levels corresponding to the plurality of different power levels;

a plurality of RSSI peak payload registers, respectively configured to store one of the plurality of peak RSSI levels for a RSSI step of the payload;

a RSSI difference register configured to store one or more RSSI differences between the plurality of peak RSSI levels;

a comparison element configured to compare the one or more RSSI differences to one or more expected RSSI differences to determine if the plurality of different power levels correspond to an expected sequence of power level differences;

one or more RSSI start registers configured to store starting positions of one or more RSSI steps within the payload; and one or more RSSI stop registers configured to store stopping positions of the one or more RSSI steps within the payload, wherein the starting positions and the stopping positions define a plurality of distinct ranges within the data packet that correspond to the one or more RSSI steps over which peak values are measured.

2. The system of claim 1, further comprising:

a result bit register configured to store a result bit having a value that indicates whether the plurality of different power levels of the payload correspond to the expected sequence of power level differences; and a processing unit configured to set the value of the result bit based upon the plurality of peak RSSI levels, an application controller configured to query the result bit register to evaluate an authenticity of the payload.

3. The system of claim 2, wherein the application controller is configured to operate in a sleep mode that consumes a first amount of power during receipt of the payload; and wherein the application controller is configured to operate in a normal operating mode that consumes a second amount of power, greater than the first amount of power, after the entirety of the payload has been received.

4. The system of claim 2, further comprising:

a difference calculation element configured to calculate one or more RSSI differences between the plurality of peak RSSI levels stored in the plurality of RSSI peak payload registers; and a RSSI difference register configured to store the one or more RSSI differences.

5. The system of claim 4, further comprising:

a RSSI expected value register configured to store the one or more expected RSSI differences between the plurality of peak RSSI levels; and wherein the comparison element is configured to compare the one or more expected RSSI differences to the one or more RSSI differences and to set the value of the result bit based upon the comparison.

6. The system of claim 5, a tolerance register configured to store one or more tolerance values;

wherein the comparison element is configured to compare the one or more RSSI differences to a sum of the one or more expected RSSI differences and at least one of the one or more tolerance values, wherein the comparison element is configured to set the value of the result bit based upon the comparison.

7. A passive keyless entry receiver system, comprising:

a receiver configured to receive a wireless signal having a data packet with a payload comprising a plurality of different power levels and to generate an RSSI (Receive Signal Strength Indicator) signal corresponding to a plurality of peak RSSI levels of the plurality of different power levels;

a plurality of RSSI peak payload registers, respectively configured to store one of the plurality of peak RSSI levels for a RSSI step of the payload having a predefined bit range;

one or more RSSI start registers configured to store starting positions of one or more RSSI steps within the payload of the data packet;

one or more RSSI stop registers configured to store stopping positions of the one or more RSSI steps within the payload of the data packet, wherein the starting positions and the stopping positions define a plurality of distinct ranges within the data packet that correspond to RSSI steps over which the plurality of peak RSSI levels are measured;

an application controller, which upon receipt of an entirety of the payload is configured to utilize a plurality of peak RSSI levels stored in the plurality of RSSI peak payload registers to determine if the plurality of peak RSSI levels correspond to an expected sequence of power levels;

a RSSI expected value register configured to store one or more expected RSSI differences between the plurality of peak RSSI levels; and a comparison element configured to compare the one or more expected RSSI differences to one or more RSSI differences and to set the value of a result bit based upon the comparison.

8. The system of claim 7, further comprising:

a result bit register configured to store the result bit having a value that indicates whether the plurality of different power levels of the payload correspond to the expected sequence of power levels; and a processing unit configured to set the value of the result bit based upon the plurality of peak RSSI levels, wherein the application controller is configured to query the result bit register and to evaluate an authenticity of the payload after receipt of the entirety of the payload.

9. The system of claim 8, wherein the application controller is configured to operate in a sleep mode that consumes a first amount of power during receipt of the payload; and wherein the application controller is configured to operate in a normal operating mode that consumes a second amount of power, greater than the first amount of power after the entirety of the payload has been received.

10. The system of claim 7, further comprising:

wherein the comparison element is configured to maintain the value of the result bit if the one or more RSSI differences are equivalent to the one or more expected RSSI differences, and wherein the comparison element is configured to toggle the value of the result bit if the one or more RSSI differences are not equivalent to the one or more expected RSSI differences.

11. The system of claim 7, further comprising:

a processing unit configured to generate an interrupt signal that is provided to the application controller to signal an authenticity of the payload.

12. The system of claim 7, wherein the receiver is arranged within a base station.

13. A method of preventing a relay attack, comprising:

receiving a wireless signal having a data packet with a payload comprising a plurality of different power levels;

determining a plurality of peak RSSI (Receive Signal Strength Indicator) levels within a plurality of pre-defined bit ranges within the payload, wherein the plurality of peak RSSI levels correspond to the plurality of different power levels and wherein the pre-defined bit ranges are defined by separate starting positions within the payload and stopping positions within the payload;

storing the plurality of peak RSSI levels in RSSI peak payload registers until an entire payload of the data packet is received;

calculating one or more RSSI differences between peak RSSI levels for one of the plurality of pre-defined bit ranges; and comparing the one or more RSSI differences to expected RSSI differences to determine if the plurality of different power levels of the payload correspond to an expected sequence of power levels.

14. The method of claim 13, comprising:

selecting a number of RSSI steps for the payload that is equal to a pre-defined number of power level differences within an expected fingerprint of the payload.

15. The method of claim 13, comprising:

setting a value of a result bit based upon the plurality of peak RSSI levels; and querying the value of the result bit or providing an interrupt signal to determine if the plurality of different power levels of the payload correspond to the expected sequence of power levels.

16. The method of claim 15, further comprising:

calculating one or more RSSI differences between peak RSSI levels of the plurality of pre-defined bit ranges;

comparing the one or more RSSI differences to expected RSSI differences;

wherein if the one or more RSSI differences are within a tolerance of the expected RSSI differences, the result bit is maintained at a first value; and wherein if the one or more RSSI differences are not within the tolerance of the expected RSSI differences, the result bit is changed to a second value.

17. The method of claim 15, further comprising:

reading the plurality of peak RSSI levels from plurality of RSSI peak payload registers after receipt of the payload is completed.

* * * * *